USOO5472724A

United States Patent [19]
Williams et al.

[11] Patent Number: 5,472,724
[45] Date of Patent: Dec. 5, 1995

[54] PROCESS FOR REDUCING THE STALING OF BAKERY GOODS

[75] Inventors: Kevin P. Williams, Festus; Steven Taillie, St. Louis; Abdelrahman A. Abdelrahman, St. Louis; Dale A. Engelbrecht, St. Louis, all of Mo.

[73] Assignee: Interstate Brands Company-Licensing Co., Kansas City, Mo.

[21] Appl. No.: 220,330

[22] Filed: Mar. 30, 1994

[51] Int. Cl.$^6$ .................................................. D21D 15/02
[52] U.S. Cl. ........................ 426/497; 426/523; 426/524
[58] Field of Search ................................ 426/523, 524, 426/497

[56] References Cited

U.S. PATENT DOCUMENTS

| | | | |
|---|---|---|---|
| 2,072,737 | 3/1937 | Duval | 426/497 |
| 4,115,596 | 9/1978 | Knutrud | 426/497 |
| 4,303,687 | 12/1981 | Ratjen | 426/497 |
| 4,366,178 | 12/1982 | Reynolds et al. | 426/524 |
| 4,991,403 | 2/1991 | Kirchhoff | 62/78 |

FOREIGN PATENT DOCUMENTS 1580442  12/1980  United Kingdom ................... 426/497

OTHER PUBLICATIONS

*Industrial and Engineering Chemistry*, vol. 31, No. 3, pp. 362–368 (1939); "Freezing As A Means of Retarding Bread Staling."
*Bakery Technology and Engineering*, (1990), Chapter 20; "The Freezing of Bakery Products" by Donald K. Tressler.

*Primary Examiner*—Helen Pratt
*Attorney, Agent, or Firm*—Hovey, Williams, Timmons & Collins

[57] ABSTRACT

The present invention relates to a process reducing the staling of fresh bakery products such as bagels, doughnuts, muffins, cakes and the like by quick chilling of the fresh baked product before the product is allowed to cool, preferably by cryogenic chilling and then allowing the product to stabilize to ambient conditions. The quick chilled product has a significant reduction in staling when subsequently maintained at ambient conditions.

21 Claims, No Drawings

PROCESS FOR REDUCING THE STALING OF BAKERY GOODS

BACKGROUND OF THE INVENTION

The present invention relates to a process for reducing the staling of bakery products, such as baked goods and doughnuts, when these products are stored under ambient conditions.

The staling of bakery goods, including baked goods of various types, has been a serious problem in the distribution of these products. For the most part, staling has been improved by the addition of various additives to reduce staling and extend the shelf life of these products. While this approach has been partially successful, it would be highly desirable to develop a procedure for reducing the staling of bakery goods without the need for these additives.

The freezing of bakery goods has been described in various publications including *Bakery Technology and Engineering* Chapter 20, "Freezing of Bakery Products" by Donald K. Tressler and a specific procedure for the freezing of baked bread goods is described in U.S. Pat. 4,366,178. The use of freezing to minimize the staling of bread is specifically described in *Industrial and Engineering Chemistry*, Vol. 31, No. 3, p. 362–368 (1939). The focus of these publications, however, is to reduce the staling of baked goods by keeping the baked goods frozen until such time as they are sold, or used by the consumer. These publications indicate that the staling action can be stopped as long as the products are frozen. The sale of frozen baked goods represent, however, an uneconomical alternative to the sale of baked goods which are normally distributed, maintained and sold at room temperature.

It is therefore, the primary object of the present invention to provide a process for reducing the staling of bakery products including without limitation bread, muffins, cakes, doughnuts, and bagels which are distributed, maintained and sold under ambient conditions.

SUMMARY OF THE INVENTION

The above object is achieved in the present invention by the chilling of a bakery product following baking or frying, but prior to the bakery product reaching ambient temperatures.

The bakery products are chilled for a time and temperature sufficient to reduce staling of the bakery goods when these goods are distributed, maintained and sold at ambient conditions. This reduction in staling by the relatively immediate chilling of the bakery good product is both dramatic and unexpected. While a reduction in staling would be expected by continued freezing or chilling of the bakery product, it is totally unexpected that chilling for a certain time and temperature following baking and immediately thereafter allowing the chilled product to return to ambient conditions improves the staling properties of the product when the product is thereafter maintained at ambient conditions. This process provides a significant reduction in staling for up to a 30-day period as compared to a bakery product that has not been chilled.

Typically, the bakery product is chilled following baking or in the case of doughnuts, frying, before the bakery product has reached an average internal temperature of about 145° F. in a period of time which is less than about 25 minutes. Rapid chilling of the product is preferably carried out by cryogenic cooling. Following rapid cryogenic chilling, the product is packaged, then allowed to return to ambient temperature before distribution or sale of the product. This exposure of the product to rapid cryogenic cooling for the indicated time period significantly reduces the staling properties of the bakery product when the product is subsequently maintained at ambient conditions, as would occur during subsequent distribution and sale of the product to the consumer.

DESCRIPTION OF THE PREFERRED EMBODIMENTS

The present process is generally applicable to a wide variety of bakery goods including baked goods such as muffins, rolls, breads, buns, cakes and bagels or fried bakery goods such as doughnuts and the like and the present invention is not intended to be limited with regard to any specific bakery product to which it is applicable provided that the product can be adequately chilled within the parameters of the present invention. For example, toroid shaped products such as doughnuts or bagels are particularly well suited for the present invention since the toroid shape provides rapid interior chilling of the product following baking. As it will hereinafter be described, it is the rapid nature of the chilling which reduces staling of the product when the product is allowed to return to ambient temperature.

Baking or frying of the product, typically takes place at a temperature of about 325° to 500° F., at a product moisture level of 25 to 55% by weight. The baked or fried product is then chilled by cryogenic cooling. The specific manner or apparatus used to provide cryogenic cooling are commercially available and typically utilize liquid nitrogen or carbon dioxide as the medium for chilling of the product. Typical, but non-limiting types of equipment include freezers wherein a helical or spiral conveyor or alternatively a tunnel is used to convey product through the freezer during which the product is exposed to cold carbon dioxide vapor or liquid nitrogen vapor as the cryogen for the freezer. A variety of commercially available freezers of this type are available from Liquid Carbonic Corporation, Chicago, Ill. or Martin Baron Co., 5454 Second St., Irwindale, Calif. 91706.

The freshly baked or fried product is conveyed on a suitable conveyer, such as a stainless steel belt to the cryogenic freezing apparatus, wherein the products having an approximate moisture level of about 25–55% preferably 37–41% by weight is chilled prior to the baked product reaching an average internal temperature of about 145° F. Preferably the product is chilled immediately after the product is removed from the baking oven or the frying vat as the case may be. Typically, the product before it is subjected to cryogenic chilling will have an average internal temperature of about 212° F. to 145° F., preferably about 205° to 210° F. Cryogenic chilling is carried out for a time and temperature sufficient to reduce staling when the bakery product is later allowed to stabilize to ambient conditions. The stabilized product is thereafter distributed and maintained at ambient conditions before sale to the consumer. Typically, cryogenic chilling is carried out for a time and temperature sufficient to reduce the average internal temperature of the bakery product to less than about 35° F., preferably to less than about 24° F. Typical times for cryogenic cooling of the product to the above average internal temperature is less than about 25 minutes, preferably 10–25 minutes or most preferably about 13–20 minutes. It is under these time and temperature conditions that chilling of the baked good has been found to have a positive improvement on the staling properties of the product when the product is allowed to stabilize to ambient conditions prior to distribution and sale. Following cryogenic chilling the product is packaged then allowed to stabilize to ambient conditions prior to shipment.

Although, the reduction in staling is readily apparent because of the cryogenic cooling step described above, it may be desirable and it is hereby intended to include within the scope of the present invention the addition of various conventional anti-staling agents which may even further improve the shelf life of these products. Typical anti-staling agents which may also be added include enzymes such as alpha amylase, emulsifiers such as mono and diglycerides, fats, such as shortening and humectants such as glycerine.

The products after stabilization to ambient conditions may be further coated or glazed, as may be the case with donuts or cakes, and then packaged for distribution and sale to the consumer. The above described process or chilling has been found to improve the shelf-life of baked goods such as bagels for as long as 30 days, which means these products would still have a desirable degree of softness, indicative of freshness for at least this long which represents a considerable improvement over a bagel which has not been chilled in the manner described.

The following Examples are intended to provide specific but non-limiting embodiments of the present invention.

EXAMPLE 1

A number of bagels was prepared using the following formula which lists the ingredients as a percentage by weight of the flour.

| INGREDIENT | % BY WEIGHT (FLOUR BASIS) |
|---|---|
| Bread Flour | 96.0 |
| Water | 58.8 |
| Gluten | 4.0 |
| High Fructose Corn Syrup DE 42 | 4.0 |
| Yeast | 2.0 |
| Dough Conditioner (liquid) | 27.5 ml |
| Salt | 2.0 |
| Egg White | 1.0 |
| Emulsifier | 0.5 |
| l-Cysteine | 0.5 |
| Diastatic Malt | 0.5 |
| Ascorbic Acid | 10 ppm |
| Calcium Propionate | 0.3 |
| Guar Gum | 0.2 |

The above ingredients were mixed at 60° F. for 30 seconds at low speed than at high speed for 10 minutes. The dough had a final temperature of 73°–75° F. The dough was subdivided into 3.5 ounce pieces, lightly coated with vegetable oil and formed into a toroid shape that is characteristic of a bagel. The formed bagel pieces were then proofed for 15 minutes at 95° F. and 90% relative humidity. The formed bagels were then submerged in boiling water for one minute, then dipped in a 6% by weight solution of potassium sorbate. The bagels were baked at 410° F. for 10–11 minutes with exposure to live steam for about 10 seconds. The baked product had an average internal temperature of 205°–210° F. and a moisture level of about 40% by weight.

The baked bagel pieces were removed from the oven and placed on a rack in a liquid nitrogen freezer Model No. MB1-1 -18-0002-19 manufactured by Martin Baron Co., 5454 Second Street, Irwindale, Calif. 91706. A thermocouple was inserted into the center of a bagel to monitor temperature. The temperature of the bagels prior to chilling was at about 195°– 205° F. The product was chilled to an internal temperature of 24° F. which required a time of about 18–19 minutes. The cryogenically chilled products were packaged immediately after removal from the chiller.

The packaged bagels were then maintained at generally ambient conditions 72° F., 60% relative humidity and evaluated over an approximately 30-day period for staling as compared to control samples, which were prepared in an identical manner to that described above but which were not quick chilled. Staling was evaluated by measuring the relative softness of the bagel using a TA-XT2 Texture Analyzer available from Texture Technologies Corporation, 18 Fairview Rd., Scarsdale, N.Y. 10583. The texture of the bagel was evaluated by slicing the bagel open to provide a ¾ inch thick slice of bagel of relatively uniform dimensions. The bagel is placed in the texture analyzer and a ¼ inch diameter probe is used to compress the bagel to 60% strain. The force in kilograms is recorded as the force necessary to compress the bagel crumb at 60% strain. Typically the force is measured on each of three replicate bagel slices about three times to provide a single average value of nine data points.

The bagels produced and packaged as described above were stored and evaluated by the above procedure over a period of about 30 days. A group of control bagels was also evaluated which were processed and packaged in an identical manner but were not subjected to quick chilling. The results of this evaluation are listed in Table 1.

TABLE 1

| | Average Force (Kg) | |
|---|---|---|
| Day | Control Bagel | Quick chilled Bagel |
| 1 | .601 | .416 |
| 4 | 1.172 | .823 |
| 7 | 1.424 | .937 |
| 10 | 1.68 | 1.144 |
| 14 | 1.411 | .957 |
| 17 | 1.712 | 1.158 |
| 21 | 2.093 | 1.307 |
| 24 | 1.754 | 1.209 |
| 28 | 2.081 | 1.093 |

The amount of force required to compress the structure of the quick chilled bagel is considerably less than the control bagels which have not been quick chilled, particularly after 7–10 days. This smaller amount of force indicates a softer bagel than the control, thereby clearly illustrating that the quick chilling process described in the present invention reduces staling.

While the above Examples represents specific but non-limiting embodiments of the present invention, it is hereby intended to include within the scope of the present invention, all reasonable variations, modifications or equivalents thereto.

What is claimed is:

1. A method of reducing the staling of bakery products when said products are maintained at ambient conditions comprising:

(a) chilling a bakery product following baking and prior to said bakery product reaching ambient temperature, to reduce the internal temperature of said bakery product to a temperature less than about 35° F. in less than about 25 minutes and thereby reduce staling of the bakery product when the product is maintained at ambient conditions; and (b) allowing the chilled bakery product to stabilize to ambient conditions.

2. The method of claim 1 wherein the bakery product has a moisture content of about 25 to 55% by weight following baking.

3. The method of claim 2 wherein the bakery product has a moisture content of about 37–41% by weight following baking.

4. The method of claim 1 wherein said bakery product is chilled prior to said bakery product reaching an internal temperature of about 212° F.

5. The method of claim 1 wherein said chilled bakery product is packaged prior to allowing the chilled bakery product to stabilize to ambient conditions.

6. The method of claim 1 wherein said bakery product is chilled prior to said bakery product reaching an internal temperature below about 145° F.

7. The method of claim 1 wherein chilling is carried out at a temperature sufficient to reduce the internal temperature of said bakery product to less than about 35° F. in about 10–25 minutes.

8. The method of claim 7 wherein chilling is carried out at a temperature sufficient to reduce the internal temperature of said bakery product to less than about 35° F. in about 13–20 minutes.

9. The method of claim 1 wherein chilling is carried out for a time and temperature sufficient to reduce the internal temperature of said bakery product to less than about 24° F.

10. The method of claim 9 wherein chilling is carried out at a temperature sufficient to reduce the internal temperature of said bakery product to less than about 24° F. in about 10–25 minutes.

11. The method of claim 10 wherein chilling is carried out at a temperature sufficient to reduce the internal temperature of said bakery product to less than about 24° F. in about 13–20 minutes.

12. The method of claim 1 wherein the bakery product is cryogenically chilled.

13. The method of claim 1 wherein said bakery product is a member selected from the group consisting of muffins, rolls, breads, buns, cakes, bagels and doughnuts.

14. The method of claim 1 wherein said bakery product includes an anti-staling agent.

15. The method of claim 14 wherein said anti-staling agent is selected from the group consisting of alpha amylase, monodiglycerides, diglycerides, fats, and glycerine.

16. A method of reducing the staling of bakery products when said products are maintained at ambient conditions comprising:

(a) chilling a bakery product to below ambient temperatures immediately following baking, to reduce the internal temperature of said bakery product to less than about 35° F. in less than about 25 minutes and thereby reduce staling of the bakery product when the product is maintained at ambient conditions; and (b) allowing the chilled bakery product to stabilize to ambient conditions.

17. The method of claim 16 wherein chilling is carried out at a temperature sufficient to reduce the internal temperature of said bakery product to less than about 35° F. in about 10–25 minutes.

18. The method of claim 17 wherein chilling is carried out at a temperature sufficient to reduce the internal temperature of said bakery product to less than about 35° F. in about 13–20 minutes.

19. The method of claim 16 wherein chilling is carried out for a time and temperature sufficient to reduce the internal temperature of said bakery product to less than about 24° F.

20. The method of claim 19 wherein chilling is carried out at a temperature sufficient to reduce the internal temperature of said bakery product to less than about 24° F. in about 10–25 minutes.

21. The method of claim 20 wherein chilling is carried out at a temperature sufficient to reduce the internal temperature of said bakery product to less than about 24° F. in about 13–20 minutes.

* * * * *